United States Patent [19]
Soffer et al.

[11] Patent Number: 5,925,591
[45] Date of Patent: Jul. 20, 1999

[54] PROCESS FOR THE PRODUCTION OF HOLLOW CARBON FIBER MEMBRANES

[75] Inventors: Abraham Soffer, Arad; Jack Gilron; Shlomo Saguee, both of Beer-Sheva; Rafael Hed-Ofek, Dimona; Haim Cohen, Beer-Sheva, all of Israel

[73] Assignees: Rotem Industries Ltd., Beer-Sheva, Israel; AGA Aktiebolag, Lidingo, Sweden

[21] Appl. No.: 08/399,443

[22] Filed: Mar. 7, 1995

[51] Int. Cl.$^6$ ..................................................... B01J 20/02
[52] U.S. Cl. ................... 502/426; 423/447.9; 423/445 R; 502/423
[58] Field of Search .............................. 423/445 R, 447.9; 264/29.4; 502/423, 426, 427

[56] References Cited

U.S. PATENT DOCUMENTS 4,412,675  11/1983  Kawakubo ........................... 423/445 R
4,425,256   1/1984  Pilipski ................................ 423/445 R
5,156,831  10/1992  Fain et al. ............................ 423/447.1

*Primary Examiner*—Michael Lewis
*Assistant Examiner*—Stuart L. Hendrickson
*Attorney, Agent, or Firm*—Kane, Dalsimer, Sullivan, Kurucz, Levy, Eisele and Richard, LLP

[57] ABSTRACT

A process for manufacturing a bundle of hollow carbon membranes comprising the steps of: (a) providing a bundle of hollow cellulose fibers; (b) removing substantially all the absorbed water from the said fibers; (c) heating the fibers to a range of temperatures where it pyrolyzes; (d) supplying to the said fibers, during at least part of the heating thereof and after the water has been removed, a catalytically effective amount of a gaseous catalyst selected from among Lewis acids, and ionic salts that are at least partially volatile at the pyrolysis temperature range.

9 Claims, 3 Drawing Sheets

PROCESS FOR THE PRODUCTION OF HOLLOW CARBON FIBER MEMBRANES

FIELD OF THE INVENTION

The present invention relates to a process for the production of carbon membranes. More particularly, the invention relates to an industrial process by means of which large bundles of high-quality hollow fibers can be produced.

BACKGROUND OF THE INVENTION

Carbon molecular sieve membranes (CMSM) and their use in the separation of various gases are known in the art, e.g., from U.S. Pat. No. 4,685,940. These membranes have been used for the separation of gas mixtures resulting from various processes. The most common process to which such methods have been applied are the separation of nitrogen and oxygen from air, but the separation of various binary gas mixtures including $N_2$, He, $O_2$ and $SF_6$ have also been carried out, and carbon membranes technology is becoming a promising field for a variety of industrial applications Unfortunately, one of the reasons which have slowed down the development of carbon membranes technology for large scale industrial purposes is that it is very difficult to manufacture hollow fiber carbon membranes modules of an industrial size. Such modules should contain thousands to hundreds of thousands of hollow fibers, which are carbonized together, and which should not be either pitted or glued together, if the module is to function properly. When attempting to manufacture such modules, however, using carbonization techniques which have been successfully applied to the pyrolysis of single fibers it has been found that the resulting module contained a large amount of broken or pitted or glued fibers, and that carbonization had not taken place uniformly along the length of the fiber bundle. This resulted in modules of poor quality and, in fact, only very small numbers of fibers could be carbonized in a bundle by such conventional techniques. Typically, up to 20–40 fibers/bundle were carbonized in a 4 mm tube. No catalyst was used in such prior art processes, and the good fibers had to be picked out from a bundle including fractured fibers.

One of the reasons why the prior art processes did not produce industrially acceptable results is that such processes were developed and implemented mainly for the carbonization of yarns, cords and fabrics, in which the fibers are already in multifilament bundles, and which do not need to carbonize evenly in an enclosed space, as in the inner part of hollow fibers. The problems associated with the carbonization of bundles are different from those of hollow fibers, mainly because the integrity of the individual fiber is not as important since the yarn can tolerate breaks in individual filaments and still be strong. Also maintaining the mechanical integrity of a hollow fiber, as opposed to a solid filament is a different task.

In general, the carbonization process comprises two main stages: 1) Pyrolysis, namely thermal decomposition, of the precursor material (preferably cellulose or some regenerated cellulose); and 2) Restructure and aromatization. The process is associated with three main technological problems:

a. The prevention of tar formation and carbon yield. The formation of tars causes the sticking together of fibers leading to embrittlement, and the tar loss is expressed in terms of lower carbon yield. The maximum theoretical yield is for cellulose carbonization 44.4% by weight (ratio of carbon residue to dry cellulose precursor).

b. Processing time. The processing time is important in order to obtain an industrially acceptable throughput of the produced fiber, via a given size of carbonization kiln.

c. Fiber strength and integrity. The mechanical properties resulting from the chosen carbonization process determine the quality (integrity) of the fiber bundle and the possible uses.

It is known in the art to manufacture carbonaceous materials by the pyrolysis of cellulosic materials. Carbonaceous materials have been manufactured for many purposes, e.g., for making textile materials (U.S. Pat. No. 3,305,315 and U.S. Pat. No. 3,527,564). The art has also recognized that carbonization can be facilitated by using carbonization catalysts, such as mineral acids and acidic salts such as phosphoric acid and diammonium hydrogen phosphates (U.S. Pat. No. 3,235,323 and U.S. Pat. No. 3,305,315), by impregnating the cellulosic material prior to pyrolysis with the catalyst. Other catalysts are described in U.S. Pat. No. 3,527,564, which are used to reduce carbonization time.

However, the preparation of hollow carbon membranes with carbonization catalysts present specific problems. In hollow carbon fibers carbonization must take place uniformly both inside and outside the fiber, and pitting must be avoided because the selectivity of the membrane depends on the uniformity of the pores produced therein during carbonization. Pitting occurs immediately if the catalyst is not uniformly distributed on the fiber, due to locally catalyzed oxidation on the surface. For instance, Shindo [*ACS Polymer Preprints*, 9, 1333 (1968)] used HCl as a catalyst, which was applied from room temperature on. This procedure results in the formation of many defects per bundle, apparently as the result of the local formation of spots of concentrated aqueous acid which is formed through the release of hydrated water during the dehydration stage.

SUMMARY OF THE INVENTION

It has now been found, and this is an object of the present invention, that it is possible to manufacture large bundles of hollow carbon membranes from hollow cellulose fiber, by employing a carbonization catalyst, while substantially avoiding fracture and cementation defects in the resulting membrane module.

It has further been found, and this is another object of the invention, that it is possible to improve the quality of the membrane bundles by operating with specific carbonization temperature profiles.

It has also been found, and this is still another object of the invention, that carbonization quality can be improved by using an inert gas as a purge gas during the carbonization process.

The process for manufacturing a bundle of hollow carbon membranes, according to the invention, comprises the steps of:

a. providing a bundle of hollow cellulose fibers;

b. removing substantially all the water from the said fibers;

c. heating the fibers to a temperature where it pyrolyzes;

d. supplying to the said fibers, during at least part of the heating thereof and after the water has been removed, a catalytically effective amount of a gaseous catalyst selected from Lewis acids and ionic salts that can be sufficiently volatilized at the pyrolysis temperature range, such as HCl and $NH_4Cl$.

According to a preferred embodiment of the invention the water is removed by heating, as a preliminary stage in the carbonization process. However it should be emphasized that the major requirement for the process to be successful is to obtain the removal of essentially all of the water which can be found on the fiber. As long as this result is achieved, the actual means by which this is done are of no importance, and for this purpose methods and apparatus other than those employed for heating can be used. For instance, water removal can be achieved by applying a vacuum or purging with dry inert gas to the bundle of hollow fibers for a sufficient period of time, preferably at elevated temeratures.

While not wishing to be bound by any particular theory, it is the belief of the inventors that the defects found in membranes bundles not produced according to the invention may derive, in part, from the fact that the catalyst, when in aqueous solution, is a solvent for the cellulosic material of the precursor fibers. Accordingly, if the catalyst is applied to the fibers before all the water has been removed, local dissolution of the fiber surface may take place, which may lead to the cementation of adjacent fibers which, in turn, will lead to the fracture of some of the cemented fibers due to non-uniform contraction during pyrolysis, and due to local pitting in the area attacked by the water soluted catalyst. Accordingly, it is critical to apply the catalyst to the fibers only after the last traces of water have been removed.

According to a preferred embodiment of the invention the partial pressure of gaseous catalyst is between 1–10,000 mBar when the catalyst is HCl or $NH_4Cl$.

According to a preferred embodiment of the invention the gaseous catalyst is supplied in a stream of inert gas. This method of application leads to two useful results: 1) the catalyst is uniformly distributed throughout the fibers bundle, avoiding "hot spots"; and 2) the inert gas acts as a purging gas, removing tars which are formed during pyrolysis of the cellulose, and which may impair membrane properties by causing undesirable occlusions therein.

According to one preferred embodiment of the invention the flow rate of the inert gas is between $10^{-3}$–10 [cc(STP)/ min-mg of carbon fiber]. While any suitable inert gas can be used, it has been found that it is convenient to operate when the inert gas is $CO_2$, Argon or Nitrogen. As will be appreciated by the skilled person, the invention is not limited to any specific temperature profiles, and the advantages deriving from the invention will be obtained with any acceptable temperatures. It has been found, however, that it is critical to maintain the temperature increase in the range of 0.1–0.6° C./min, in the temperature range of 120–400° C. Without wishing to be bound by any specific theory, it is the inventor's belief that if this condition is not observed the diffusive penetration of HCl into the bore and evacuation of evolving water vapor from the bore through the fiber wall does not fully take place. It should be noted that the slow temperature rise is necessary even in the presence of catalysis, which is unexpected because with solid carbon fiber precursors the use of a catalyst permits sensibly to shorten the carbonization time.

The abovementioned time/temperature profile is an average value, and can be obtained thorough a uniform profile or by a series of faster and slower heating steps, in which case the said heating steps should preferably not exceed a rate of 1° C./min.

The invention is also directed to an apparatus for manufacturing hollow carbon fibers, comprising a tube or muffle furnace heated with electric coils or inductively, a metal, quartz or ceramic tube or, if inductive heating is used, a graphite tube, defining the heating space, a quartz, ceramic or metal tube holding the fiber bundle which in one of the embodiments is flared at one end to ease the introduction of the fiber bundle, and appropriate end plate with gas feed manifold.

DETAILED DESCRIPTION OF PREFERRED EMBODIMENTS

Figure 1:
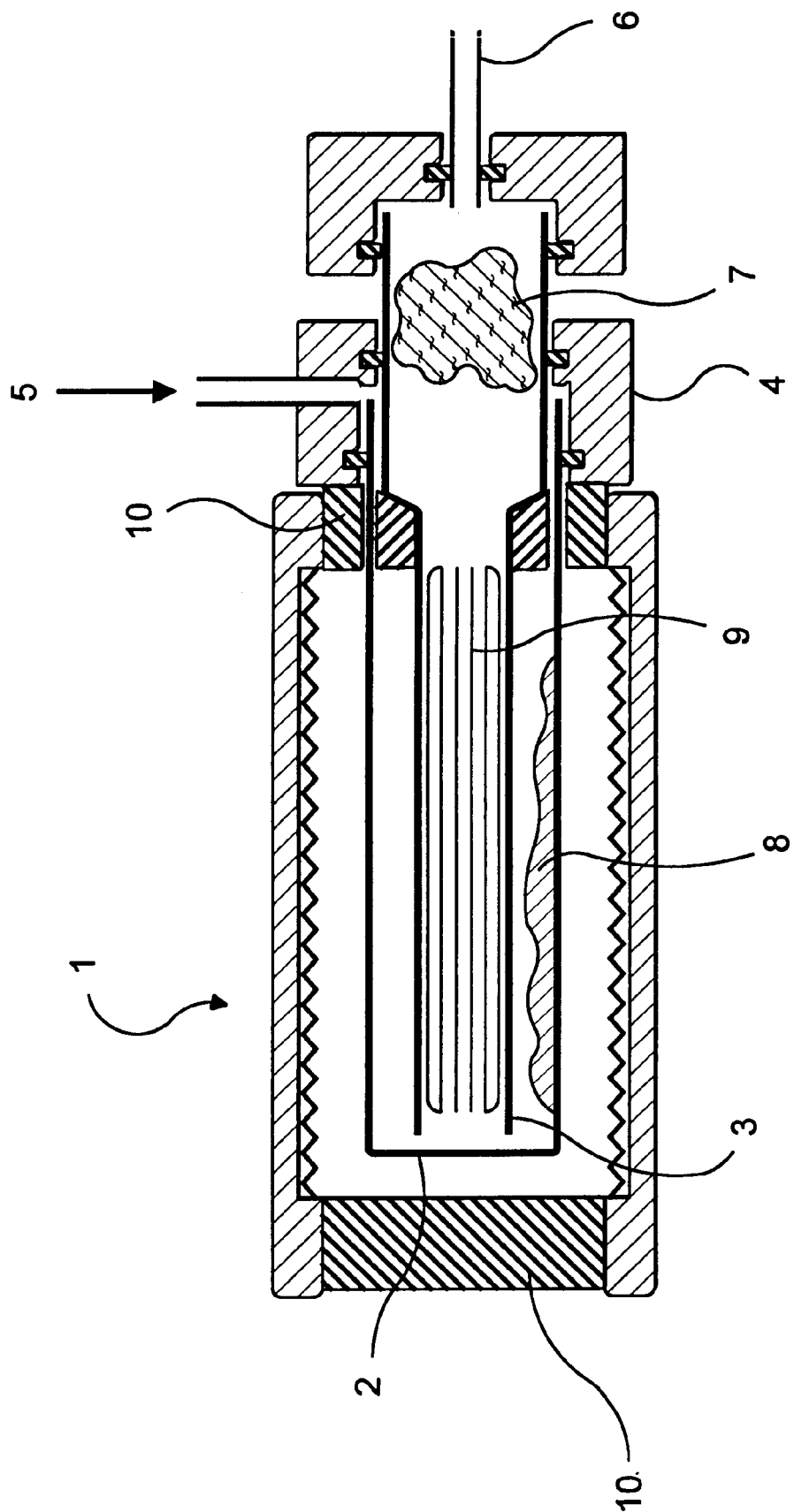
FIG. 1 illustrates a carbonization apparatus according to one particular embodiment of the invention.

Referring to FIG. 1, the heating element 1 surrounds the furnace tube 2, which in this apparatus is made of quartz. This tube is open at one end to permit the introduction of the pyrolysis tube 3, containing a fibers bundle 9. The hollow fiber bundle is surrounded by a catalyst powder 8, and includes insulation 10. The gas leaving the hollow fiber bundle passes through a loose filter plug 7 and then exits the furnace 6. The packing density of the bundle may vary over a wide range, from a situation in which neighboring fibers do not touch ($PD_0$) to a relatively high packing density. In this context, by way of illustration, packing the fibers so that their packing density is about 20% of the density obtained by packing them in a hexagonal packing configuration ($PD_{20}$), is considered a relatively high packing density. The pyrolysis tube 3 is connected in the furnace to an end flange 4 containing a gas inlet 5 for the feeding of inert sweep gas and gaseous catalyst. The port and manifold are so arranged that the gas is forced to flow into the flange and down an annular space formed by the furnace wall 2 and the outside wall of the pyrolysis tube 3. At the far end of the furnace the gas enters the precursor fiber bundle and flows longitudinally toward the exit 6, carrying out the gaseous pyrolysis decomposition products. This arrangement allows for the preheating of the gas to the furnace temperature before it sees the fiber bundle and thus allows for more precise control of the process. The temperature of the furnace is controlled by a programmable controller (not shown) which can provide for a series of heating ramps and dwells.

Figure 2:
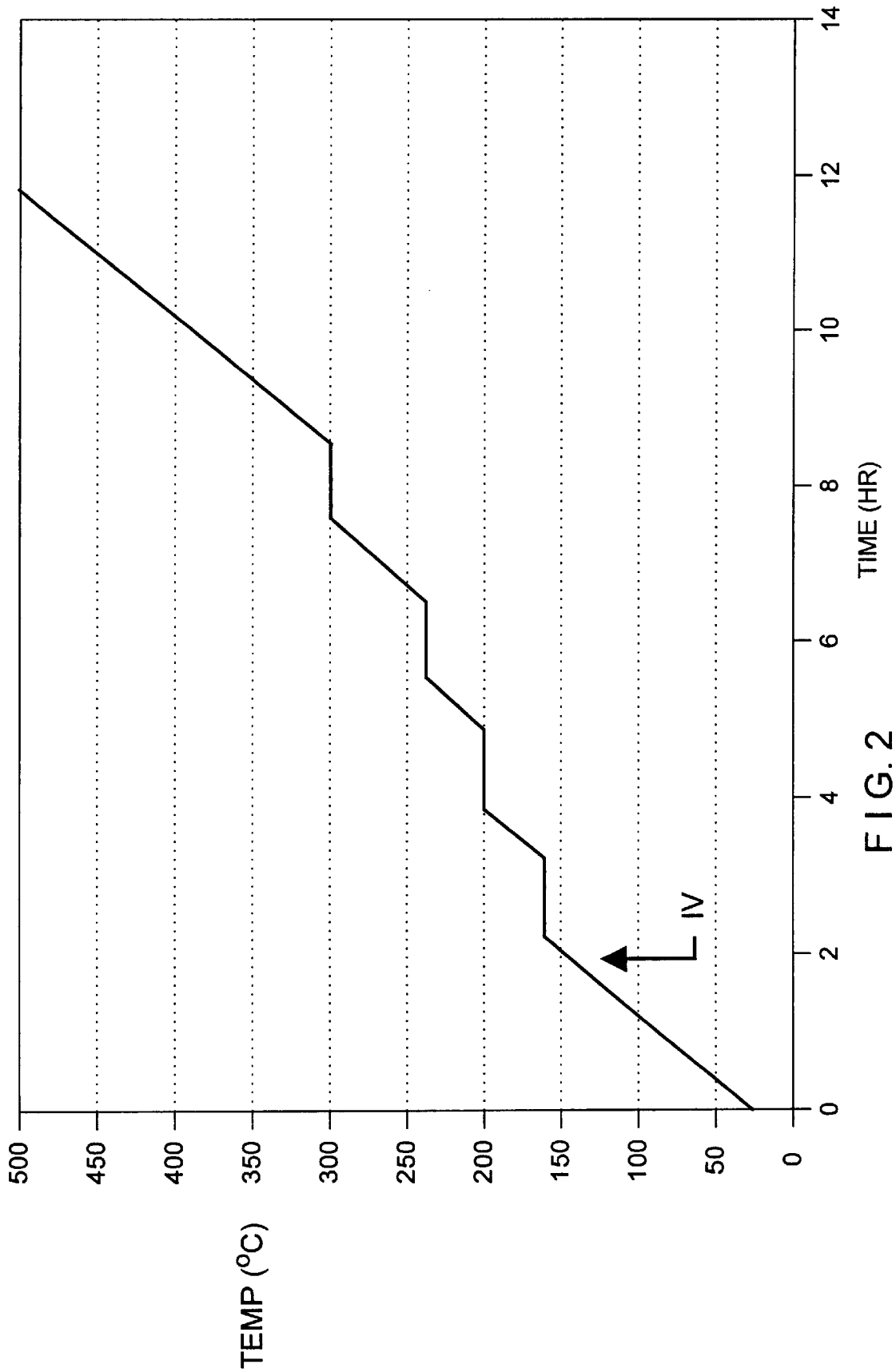
FIG. 2 shows a typical temperature profile for hollow fibers carbonization.

A typical temperature profile obtained in the apparatus of FIG. 1 is shown in FIG. 2, wherein the carrier gas is argon. In the figure, IV notes the time when catalyst vapor (HCl) has been introduced.

EXAMPLE 1

Effect of HCl on Catalyzing Carbonization of Hollow Fibers

The fibers were packed as bundles in a pyrolysis tube. The tube was placed inside an oven and connections were provided to allow communication of gas and vapors into the tube and conduction of gases and vapors away from the tube (FIG. 1). The oven temperature was maintained by an automatic control unit whose input came from thermocouples placed in close proximity to the pyrolysis tube. The temperature was raised to 150–160° C. and maintained at that temperature for 16 hours. The purge gas (argon) was continuously flowed through the pyrolysis tube to carry away the gaseous pyrolysis products.

The effect of introducing a catalyst gas was examined by feeding HCl in the purge gas at concentrations varying between 0–12% for the first 1.5 hours of the pyrolysis.

The results are presented in Table I.

TABLE I

| T ° C. | % HCL (V/V) | Weight | % breakage | fiber appearance | pyrolysis products |
|---|---|---|---|---|---|
| 150 | 0.0 | 16.7 | extensive | light beige | none |
| 160 | 1.0 | 17.7 | extensive | reddish brown | none |
| 150 | 12.0 | 16.5 | very few | black | deposit on tube wall |

EXAMPLE 2

Effect of Temperature of Introduction of the Catalyst

The setup was the same as in Example 1, except that the fibers were subjected to a temperature profile as shown in FIG. 2. During this temperature change, the purge gas (argon) was flowing continuously. At different temperatures, the catalyst gas (HCl) was introduced in a 12% (v/v) concentration and the flow of the catalyst gas was maintained until the temperature profile reached 700° C. The fibers were tested for burst pressure. The results of this are shown in Table II.

TABLE II

| T ° C. of HCl Introduction | P (burst) (bar) |
|---|---|
| TR | 20–25 |
| 120 | 40 |
| 160 | 120 |

EXAMPLE 3

Control of Humidity and Packing Density in Carbonization

A study was conducted of the factors affecting carbonization of cuprammonium regenerated cellulose hollow fiber of wall thickness 16 $\mu$m and outer diameter of 175–200 $\mu$m. The three factors were humidity, density and ageing. A factorial design was used in which levels were assigned a value of 1 is applied intentionally or 0 if reasonably prevented. This created $2^3$ combinations.

TABLE III

| fract +/cell | No. of fractures in each membrane cell | # of cells | wetted | aged | Dense pack | Treatment no. |
|---|---|---|---|---|---|---|
| .8 [4.8] | 0, 3, 0, 1, 0, [25] | 5 (6) | 0 | 0 | 0 | 0 |
| 9.2 | 14, 3, 8, 12 | 4 | 0 | 0 | 1 | 1 |
| 1.7 | 4, 1, 0 | 3 | 0 | 1 | 0 | 2 |
| 7 [>>] | 100, 6, 7 | 3 | 0 | 1 | 1 | 3 |
| >> | 100 | 1 | 1 | 0 | 0 | 4 |
| >> | 20, 100, 100, 18 | 4 | 1 | 0 | 1 | 5 |
| >>> | 100 | 1 | 1 | 1 | 0 | 6 |
| >>> | 100 | 1 | 1 | 1 | 1 | 7 |

>>No. of fractures too large to count
>>>crushed bundle: hundreds of fractures

The carbonization apparatus used was as in FIG. 1, and the temperature profile as in FIG. 2. Unless specified in the table footnotes, the experimental conditions and definitions of criteria are as follows:

1) Fibers type: cuprammonium cellulose. Precursor HF wall thickness 16$\mu$.

2) Dense packing (into a 7.5 mm ID tube):300–320 fibers. Loose packing: 200–250 fibers bundle length: 85–100 cm 3) Ageing time: 5–10 days for dry bundles. Overnight for a wet bundle. Fresh bundle: Dry position—10–30 minutes between ethanol removal and applying the carbonization thermochemical program. Wet position: two hours, which is the time of wetting.

4) Wetting conditions: 100 120 liters of cylinder air, passed within two hours through a water bubbler. This time lapse should in fact be considered as ageing in the "fresh" wetted bundles (treatments 4.5 in Table III).

The results shown in the table are summarized as follows:

1. Treatments 4–7 unequivocally indicate that the wetted membranes are severely fractured.

2. Intermediate extent of fracturing is found whenever densely packed, nonwetted bundles were employed (positions 1,3).

3. The best results were obtained for nonwetted aged or for nonwetted and fresh bundles.

Exposing the bundle to humid air (70–90% RH) for a prolonged time lead to major fractures, as shown in Table III. This indicates that humidity is in fact deleterious to the carbonizing precursor bundle. This effect is aggravated when hydrogen chloride gas serves as a carbonization catalyst. A concentrated aqueous solution of hydrogen chloride is a solvent to cellulose. Therefore, the combined presence of HCl and humidity over the decomposed cellulose fibers may lead to cementation and fracturing. As a result, the thorough drying of the precursor is an essential factor when using HCl as a catalyst.

Figure 3:
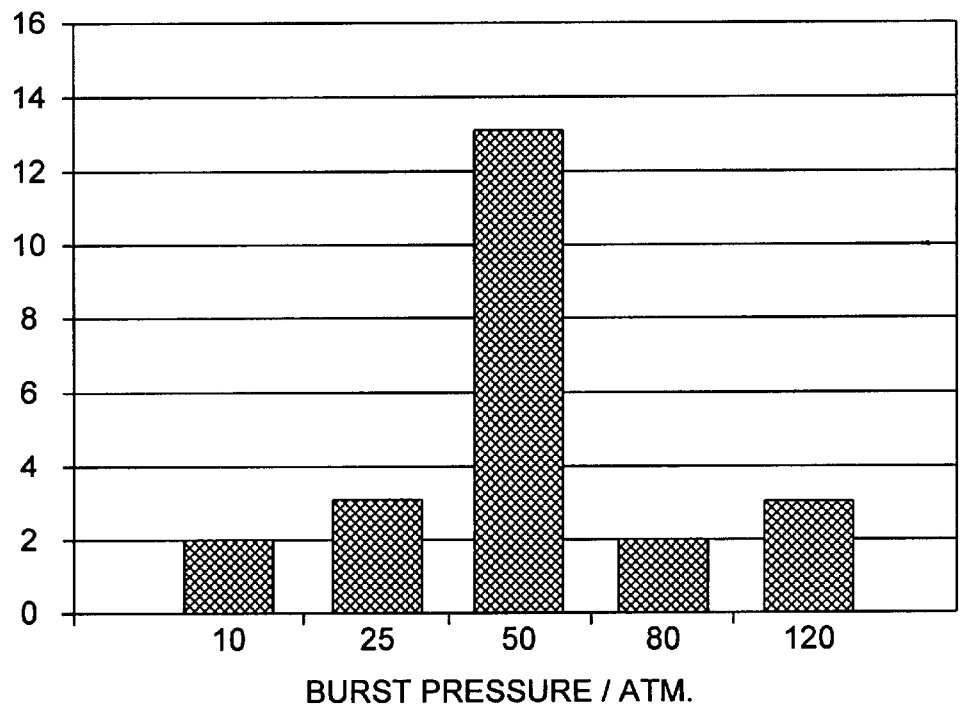
FIG. 3 is a histogram showing the burst pressure probabilities for prior art hollow carbon membranes.
Figure 4:
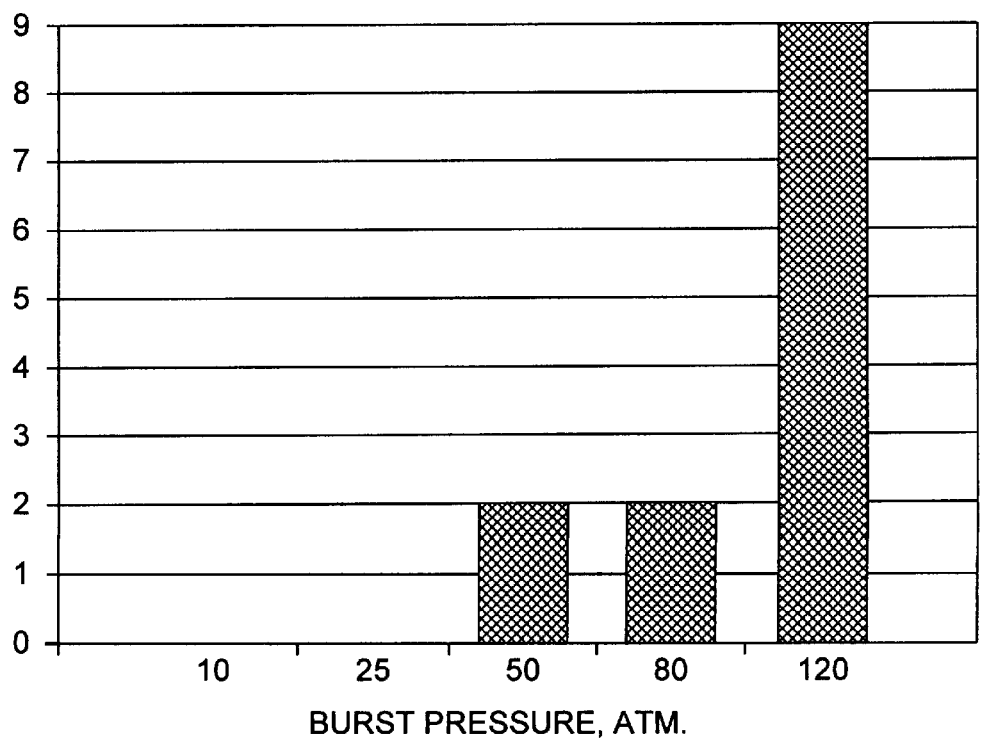
FIG. 4 is a histogram showing the burst pressure probabilities for hollow carbon membranes prepared according to the invention.

The improvements of the carbonization in terms of reducing the amount of fractures and defects is best expressed by the histograms of the hollow fibers burst pressure data. These are given as histograms in FIGS. 3 and 4. The increase in the most probably burst pressure from 50 atm to about 120 atm is remarkable. FIG. 3 is the histogram of prior art membranes, while FIG. 4 shows the results obtained with membranes carbonized according to the invention (fractured No. 0 in Table III).

EXAMPLE 4

Use of NH$_4$Cl as Carbonization Catalyst

The apparatus used for providing ammonium chloride vapor for the catalyst is as in FIG. 1. Crystals of ammonium chloride were placed on the bottom of the oven floor 2. They released vapor according to their equilibrium vapor pressure. The inert gas flowing through the annulus formed by the oven 2 and pyrolysis tube 3 picked up the released vapor and carried it into the entrance of the pyrolysis tube and along the bundle. At the exit a cold trap was provided to collect the ammonium chloride vapors before they would crystallize and plug the exit channels.

Results of using such an apparatus are shown in Table IV for a series of four batches of carbon precursors.

TABLE IV

| FIBERS/BATCH | GAS FLOW (CM$^3$/MIN) | % LENGTH YIELD | % WEIGHT YIELD |
|---|---|---|---|
| 400 | 200 | 75.0% | 42.3% |
| 300 | 100 | 75.7% | 40.1% |

TABLE IV-continued

| FIBERS/BATCH | GAS FLOW (CM³/MIN) | % LENGTH YIELD | % WEIGHT YIELD |
|---|---|---|---|
| 300 | 200 | 77.1% | 42.0% |
| 300 | 200 | 75.0% | 37.9% |

The carrier gas was argon. All fibers were 200 μm outer diameter and 160μ inner diameter. Ammonium chloride catalyst was 10 g for each batch. The weight yields are close to the maximum theoretically possible, and involve less than the loss of one carbon atom per glucosidic ring.

EXAMPLE 6

Effect of Dwells in the Temperature Profile

Literature reports on the use of HCl and other catalysts to accelerate the rate of carbonization of solid fibers allow rapid rates of heating (>1° C./min) throughout the temperature profile. However, carbonization of hollow fibers with catalysts still requires certain steps to be conducted slowly (0.1–0.6° C./min, preferably at 0.2° C./min) in the critical dehydration stage (120–290° C.) where dehydration must be promoted without depolymerization. This is demonstrated in this example. Three precurser bundles of 250 fibers each, a length of 1 m and outer diameter of 200 μm were carbonized using the apparatus described in FIG. 1. The temperature profile for the three bundles is shown in Table V. As can be seen, the bundle #1530 is the only one with dwell times in the critical temperature range.

TABLE V

| Carboniz # | Step # | HCL CC/M | ATc CC/M | Dwell AT Tmax | Heat Rate ° C./min | ° C. Tmin | Heating Step Tmax |
|---|---|---|---|---|---|---|---|
| 1532 | 1 | 24 | 240 | 0 | 3 | 26 | 100 |
|  | 2 | 24 | 240 | 0 | 1 | 100 | 730 |
|  | 3 | 0 | 240 | 0 | 1 | 730 | 810 |
|  | 4 | 0 | 240 | 0 | 4 | 810 | 20 |
| 1531 | 1 | 24 | 240 | 0 | 1 | 26 | 100 |
|  | 2 | 24 | 240 | 0 | 1 | 100 | 730 |
|  | 3 | 0 | 240 | 0 | 1 | 730 | 810 |
|  | 4 | 0 | 240 | 0 | 4 | 810 | 20 |
| 1530 | 1 | 20 | 200 | 60 | 1 | 40 | 160 |
|  | 2 | 20 | 200 | 60 | 1 | 160 | 210 |
|  | 3 | 20 | 200 | 60 | 1 | 210 | 240 |
|  | 4 | 20 | 200 | 90 | 1 | 240 | 300 |
|  | 5 | 12 | 135 |  | 1 | 300 | 500 |
|  | 6 | 0 | 135 |  | 2 | 500 | 730 |
|  | 7 |  |  |  | 3 | 730 | 830 |

After carbonization, all of the bundles were examined for mechanical integrity. This was done in two ways. The first way was to count the number of fibers which came out of the pyrolysis tube with fractures. The result is expressed as the % of the fiber bundle to be found with fractures. The second way was far more severe and could thus distinguish more clearly between the bundles. In this second test the pyrolized fibers from a bundle were made to pass through a glass tube with a radius of curvature of only 1.5 cm. The percent bundle of fibers which fractured on passing through the tube was then determined. Finally, the internal burst pressures were determined on random samples from bundle #1530. This could not be done on the other two bundles as they had too many fractured fibers. The results are shown in Table VI. The results clearly indicate the importance of dwell time in the temperature profile even when catalysts are applied.

TABLE VI

| Carboniz # | Burst P (bar) | Bend Test Failure Rate | Tensile Strength (gf/fiber) | % of bundle fracture | % weight yield | % length yield |
|---|---|---|---|---|---|---|
| 1532 | NM | 90% | 125.0 | 1.60% | 31.0 | 71.0 |
| 1531 | NM | 50% | 128.2 | 0.80% | 35.9 | 79.8 |
| 1530 | 67 | 10% | 131.0 | 0.40% | 30.1 | 72.5 |

EXAMPLE 6

Preparation of 1000 Fiber Bundles

The apparatus used was as in FIG. 1, and the temperature profile was similar to that in FIG. 2. The catalyst vapors used were alternatively NH$_4$Cl as in Example 4, and HCl as in Example 2. Bundles of 1000 fibers approximately 1 m long were loaded in 16 mm pyrolysis tubes to give packing densities which were about 17% of closest packing density. This quantity would produce enough for a membrane module with 0.2 m² of active area. The results are given in Table VII.

TABLE VII

| Carboniz # | # fibers per bundle | Packing Density (% HCP) | Tensile Strength (gf/fiber) | % of bundle fracture | % weight yield | % length yield |
|---|---|---|---|---|---|---|
| 1441 [HCl (5.4%)] | 1200 | 18.8% | 100.2 | 0.33% | 31.3 | 71.8 |
| 1436 [HCl 6.2%] | 1200 | 18.3% | 89.9 | 0.25% | 31.1 | 71.4 |
| 546 [NH$_4$Cl] | 1000 | 15.3% | 102.3 |  |  | 76.0 |

The above description of preferred embodiments and examples have been provided for the purpose of illustration and are not intended to limit the invention. Many modifications can be effected in the carbonization process described above, without exceeding the scope of the invention.

We claim:

1. A process for manufacturing a bundle of hollow carbon, molecular sieve membranes, comprising the steps of:
    (a) providing a bundle of hollow cellulose fibers;
    (b) removing substantially all the absorbed water from the said fibers;
    (c) heating the fibers to a range of temperatures where it pyrolyses;
    (d) supplying to the said fibers, during at least part of the heating thereof and after the water has been removed, a catalytically effective amount of a gaseous carbonization catalyst selected from among Lewis acids, and ionic salt that are at least partially volatile at the pyrolysis temperature range.

2. A process according to claim 1, wherein the absorbed water is removed by heating.

3. A process according to claim 1, wherein the catalyst is selected from HCl and NH$_4$Cl.

4. A process according to claim 3, wherein the amount of gaseous carbonization catalyst is between 1–10,000 mBar.

5. A process for manufacturing a bundle of hollow carbon molecular sieve membranes comprising the steps of:
    (a) providing a bundle of hollow cellulose fibers;
    (b) removing substantially all the absorbed water from the said fibers;

(c) heating the fibers to a range of temperatures where it pyrolyses;

(d) supplying to the fibers, during at least part of the heating thereof and after the water has been removed, a catalytically effective amount of a gaseous carbonization catalyst selected from among Lewis acids, and ionic salts that are at least partially volatile at the pyrolysis temperature range, wherein the temperature profile is such that the temperature increase is maintained in the range of 0.1–0.6° C./min in the temperature range of 120–400° C.

6. A process for manufacturing a bundle of hollow carbon molecular sieve membranes comprising the steps of:

(a) providing a bundle of hollow cellulose fibers;

(b) removing substantially all the absorbed water from the said fibers;

(c) heating the fibers to a range of temperatures where it pyrolyzes;

(d) supplying to the fibers, during at least part of the heating thereof and after the water has been removed, a catalytically effective amount of a gaseous carbonization catalyst selected from among Lewis acids, and ionic salts that are at least partially volatile at the pyrolysis temperature range, wherein the gaseous carbonization catalyst is supplied in a stream of inert gas.

7. A process according to claim 6, wherein the flow rate of the inert gas is between $10^{-3}$–10 cc(STP)/min-mg of carbon fiber.

8. A process according to claim 6, wherein the inert gas is selected from the group consisting of $CO_2$, $N_2$ or Argon.

9. A process according to claim 1, wherein the packing density of the fiber bundle is from $PD_0$ to $PD_{20}$ expressed as the percentage of the density obtained by packing the fibers in a hexagonal packing configuration.

* * * * *